(12) United States Patent
Nishikawa et al.

(10) Patent No.: US 10,088,624 B2
(45) Date of Patent: Oct. 2, 2018

(54) LIQUID CRYSTAL DISPLAY DEVICE

(71) Applicant: Japan Display Inc., Tokyo (JP)

(72) Inventors: Masaki Nishikawa, Tokyo (JP);
Tetsuya Ooshima, Tokyo (JP);
Yasuhisa Shiraishi, Tokyo (JP);
Masateru Morimoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/420,648

(22) Filed: Jan. 31, 2017

(65) Prior Publication Data

US 2017/0227701 A1 Aug. 10, 2017

(30) Foreign Application Priority Data

Feb. 5, 2016 (JP) .................................. 2016-020674

(51) Int. Cl.
*G02F 1/1335* (2006.01)
*F21V 8/00* (2006.01)

(52) U.S. Cl.
CPC ........... *G02B 6/005* (2013.01); *G02B 6/0051* (2013.01); *G02B 6/0053* (2013.01); *G02B 6/0055* (2013.01); *G02F 1/133528* (2013.01); *G02F 1/133621* (2013.01); *G02F 1/133615* (2013.01); *G02F 2001/133614* (2013.01); *G02F 2201/501* (2013.01); *G02F 2202/28* (2013.01); *G02F 2202/36* (2013.01); *G02F 2203/03* (2013.01)

(58) Field of Classification Search
CPC ......................... G02B 6/0068; G02F 1/133524
See application file for complete search history.

(56) References Cited

U.S. PATENT DOCUMENTS

| 2012/0113672 | A1  | 5/2012  | Dubrow et al. |
| 2013/0250614 | A1* | 9/2013  | Thompson ........... G02B 6/0025 362/608 |
| 2016/0377786 | A1* | 12/2016 | Ham ................. G02F 1/133603 349/65 |

FOREIGN PATENT DOCUMENTS

JP 2013-544018 A 12/2013

* cited by examiner

*Primary Examiner* — Phu Vu
(74) *Attorney, Agent, or Firm* — Typha IP LLC (57) ABSTRACT

To provide a thin liquid crystal display device featuring excellent color reproducibility. The liquid crystal display panel includes: a liquid crystal display panel outputting different colors on a per-pixel basis; and a backlight. The backlight includes: a light source; a light guide; a reflective sheet on a back side of the light guide; and a group of optical sheets including a wavelength converter and disposed between the liquid crystal display panel and the light guide. The wavelength converter has a structure where quantum dots are dispersed in a transparent medium. The wavelength converter is bonded to another optical medium by means of a diffusing adhesive. Nanoparticles for developing Rayleigh scattering are dispersed in the wavelength converter.

17 Claims, 8 Drawing Sheets

| | $Al_2O_3$ | $Bi_2O_3$ | $FeO_2$ | $CoO$ | $CuO$ | $Fe_2O_3$ (α) | $Fe_2O_3$ (γ) | $Ho_2O_3$ | ITO | $Mn_3O_4$ | $SiO_2$ | $SnO_2$ | $TiO_2$ | $Y_2O_3$ | ZnO |
|---|---|---|---|---|---|---|---|---|---|---|---|---|---|---|---|
| AVERAGE PARTICLE SHAPE (nm) | 31 | 51 | 14 | 22 | 48 | 39 | 29 | 38 | 30 | 56 | 25 | 21 | 36 | 33 | 34 |
| PARTICLE SHAPE | SPHERE | SPHERE | POLYHEDRON | SPHERE | POLYHEDRON | SPHERE | SPHERE | SPHERE | HORN | SPHERE | SPHERE | HORN | SPHERE | SPHERE | POLYHEDRON |

FIG. 7

| wt % | 0 | 5% | 10% | 15% | 20% | 25% | 30% | 35% | 40% | 45% | 50% |
|---|---|---|---|---|---|---|---|---|---|---|---|
| vol % | 0 | 1.8% | 3.6% | 5.4% | 7.1% | 8.9% | 10.7% | 12.5% | 14.3% | 16.1% | 17.9% |
| HAZE THICKNESS OF DIFFUSING ADHESIVE LAYER 23 μm | 0 | 2.8% | 5.5% | 8.3% | 11.0% | 13.8% | 16.5% | 19.3% | 22.0% | 24.8% | 27.5% |
| HAZE THICKNESS OF DIFFUSING ADHESIVE LAYER 12 μm | 0 | 1.4% | 2.9% | 4.3% | 5.7% | 7.2% | 8.6% | 10.0% | 11.5% | 12.9% | 14.4% |
| ADHESIVE FORCE * | ◎ | ◎ | ◎ | ◎ | ◎ | ◎ | ◎ | ○ | ○ | ○ | × |

* 2N/25 mm OR MORE : ◎, 2N/LESS THAN 25 mm 1N/25 mm OR MORE : ○, 1N/LESS THAN 25 mm : ×

FIG. 12 ately, the invention relates to a liquid crystal display device
LIQUID CRYSTAL DISPLAY DEVICE

CLAIM OF PRIORITY

The present application claims priority from Japanese Patent Application JP 2016-020674 filed on Feb. 5, 2016, the content of which is hereby incorporated by reference into this application.

BACKGROUND OF THE INVENTION

(1) Field of the Invention

The present invention relates to a display device. Particularly, the invention relates to a liquid crystal display device which is configured to form a color image by using a wavelength converter including a wavelength conversion particle and to address view angle dependence of chromaticity.

(2) Description of the Related Art

The liquid crystal display device has a structure which includes: a TFT substrate including pixel electrodes, thin film transistors (TFTs) and the like arranged in a matrix form; a counter substrate opposed to the TFT substrate; and liquid crystal sandwiched between the TFT substrate and the counter substrate. The display device forms an image by per-pixel control of transmittance of light through liquid crystal molecules.

A backlight is disposed on a back side of a liquid crystal display panel because the liquid crystal per se does not emit light. The liquid crystal display device for use in a cellular phone or the like employs an LED (Light Emitting Diode) as a light source of the backlight. The backlight has a structure where LEDs are arranged along the sides of a light guide, a variety of optical sheets are laid on the light guide, and these optical components are accommodated in a mold.

According to the prior art, the liquid crystal display panel employs a white light as the light source of the backlight and forms a color image by using color filters.

Although the backlight of the liquid crystal display device must be a white light, the LED emits a monochromatic light. In this connection, the liquid crystal display device adopts means which obtains the white light by using a UV LED or blue LED in combination with a light converter which generates light of a longer wavelength.

A fluorescent lamp may be sometimes used as the light converter. More recently, however, a method of using quantum dots has been developed as a method featuring higher conversion efficiency. A structure of a backlight using the quantum dots for wavelength conversion is disclosed in Patent Literature 1 (JP-A No. 2013-544018).

SUMMARY OF THE INVENTION

In a case where the blue LED is used as the light source, the blue light for red pixels is converted to a red light, while the blue light for green pixels is converted to a green light. In the wavelength conversion, the red light and green light are scattered by the quantum dots. On the other hand, blue pixels can use the blue light as it is and hence, the blue light is not scattered and goes straight.

When a display screen is viewed from the front side, the blue color is dominant so that the display screen appears blue. When the display screen is obliquely viewed, the red and green colors are dominant so that the display screen appears yellow. If the white balance of the display screen is established as viewed from the front side, the display screen appears yellow when obliquely viewed.

An object of the invention is to overcome a problem caused by the difference in the scattering degree between the blue light and the light of other color in the case where the wavelength converter including the quantum dots is used for the backlight.

For achieving the above object, the invention features principal specific means as follows.

1. A liquid crystal display device, which includes a liquid crystal display panel outputting different colors on a per-pixel basis, and a backlight, has a structure wherein the backlight includes: a light source; a light guide; a reflective sheet on a back side of the light guide; and a group of optical sheets including a wavelength converter and disposed between the liquid crystal display panel and the light guide, the wavelength converter has a structure where quantum dots are dispersed in a transparent medium, the wavelength converter is bonded to another optical medium by means of a diffusing adhesive, and the diffusing adhesive has nanoparticles dispersed therein for developing Rayleigh scattering.

2. A liquid crystal display device, which includes a liquid crystal display panel outputting different colors on a per-pixel basis, and a backlight, has a structure wherein the backlight includes: a light source; a light guide; a reflective sheet on a back side of the light guide; and a group of optical sheets including a wavelength converter and disposed between the liquid crystal display panel and the light guide, the wavelength converter has a structure where quantum dots are dispersed in a transparent medium, at least one of the group of optical sheets is formed with irregularities on a surface thereof, and the irregularities are characterized by exhibiting the higher refractive index for light of the shorter wavelength.

DETAILED DESCRIPTION OF THE PREFERRED EMBODIMENTS

The invention will hereinbelow be described in detail with reference to the embodiments thereof.

First Embodiment

Figure 1:
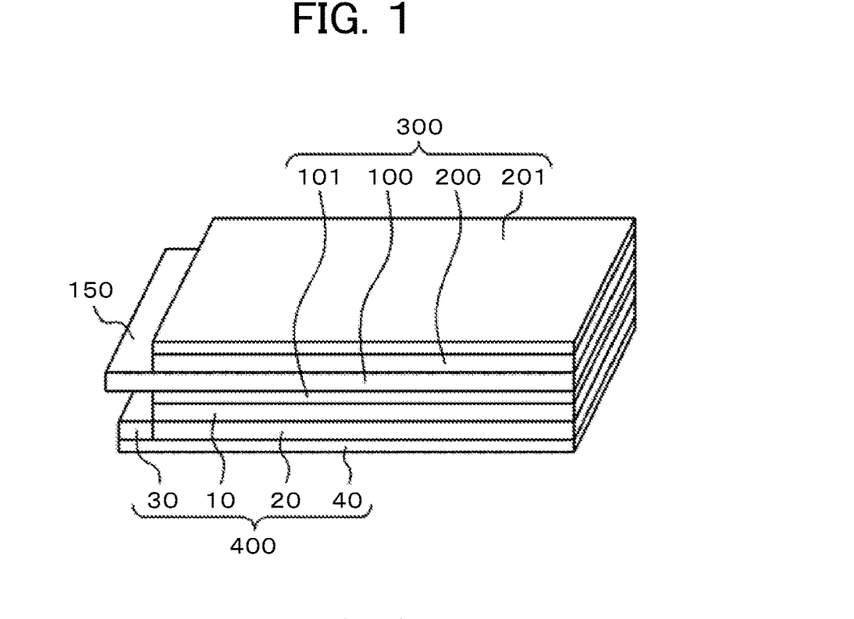
FIG. 1 is a perspective view showing a liquid crystal display device.

FIG. 1 is a perspective view showing a liquid crystal display device. The liquid crystal display device includes a liquid crystal display panel 300 and a backlight 400. The liquid crystal display panel 300 has a structure in which a liquid crystal is sandwiched between a TFT substrate 100 where TFTs (thin film transistors) and pixels having pixel electrodes are arranged in a matrix form, and a counter substrate 200, and in which a lower polarizer 101 is attached to a lower side of the TFT substrate 100 while an upper polarizer 201 is attached to an upper side of the counter substrate 200. The TFT substrate 100 is formed larger than the counter substrate 200. A single-layered portion of the TFT substrate 100 defines a terminal section 150 provided with a driver IC and formed with a terminal connected with a flexible wiring substrate.

The backlight 400 is disposed on a back side of the liquid crystal display panel 300. In FIG. 1, the backlight 40 includes: alight source 30 including LEDs; a light guide 20 and a group of optical sheets 10. The optical sheet group 10 includes a wavelength conversion layer, a polarizing reflector, a prism sheet and the like. These components may also be combined into one piece by means of an adhesive.

Figure 2:
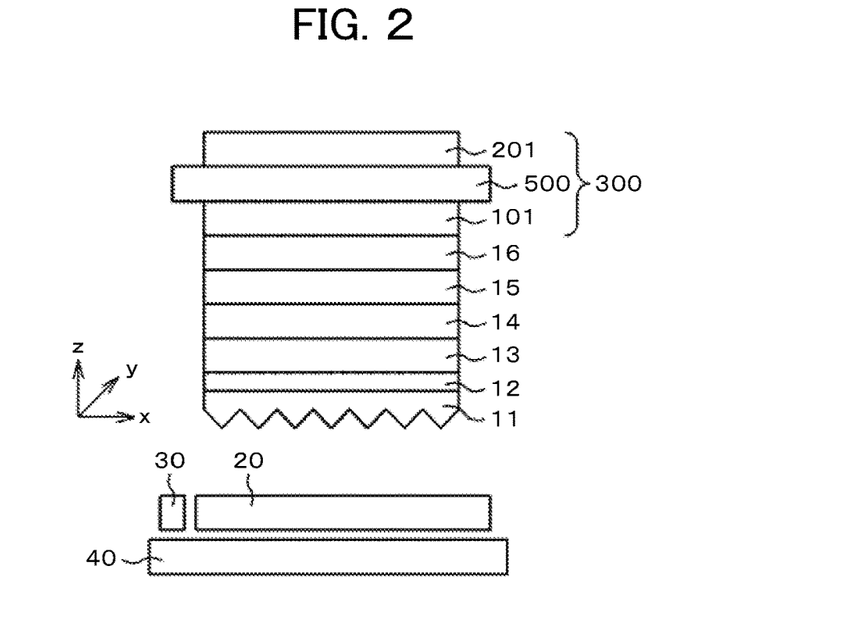
FIG. 2 is a sectional view of the liquid crystal display device.

FIG. 2 is a sectional view of the liquid crystal display device according to the invention. Referring to FIG. 2, the liquid crystal display panel is essentially composed of a liquid crystal cell 500 including a combination of the TFT substrate and the counter substrate, the lower polarizer 101, and the upper polarizer 201. The optical sheet group is attached to the lower polarizer 101 of the liquid crystal display panel. The group of optical sheets is combined into one piece by means of an adhesive 12, a diffusing adhesive 14 and an adhesive 16.

In FIG. 2, a blue LED 30 as a light source is disposed on a lateral side of the light guide 20. A reflective sheet 40 is disposed under the light guide 20 in order to direct the light toward the liquid crystal display panel. The reflective sheet 40 may be a thin metal film made of Ag or Al having high reflectivity, or may otherwise be a dielectric multilayer called ESR.

The light outgoing from the light guide 20 toward the liquid crystal display panel 300 is first incident on a prism sheet 11 and then, enters a wavelength converter 13 so as to be converted to a red light and a blue light through wavelength conversion. Subsequently, the converted lights pass through a polarizing reflector 15 to enter the lower polarizer 101 of the liquid crystal display panel. All the components from the prism sheet 11 to the lower polarizer 101 are unified by means of the adhesives and the like.

Referring to FIG. 2, the prism sheet 11 is a so-called reverse prism, the prism surface of which is located on the side of the light guide 20. The prism sheet 11 shown in FIG. 2 directs an x-direction light toward the liquid crystal display panel 300. A prism sheet including a prism extended in a direction orthogonal to the extending direction of the prism of FIG. 2 is required for directing a y-direction light toward the liquid crystal display panel. According to the invention, a single highly effective prism sheet 11 is employed.

Figure 3:
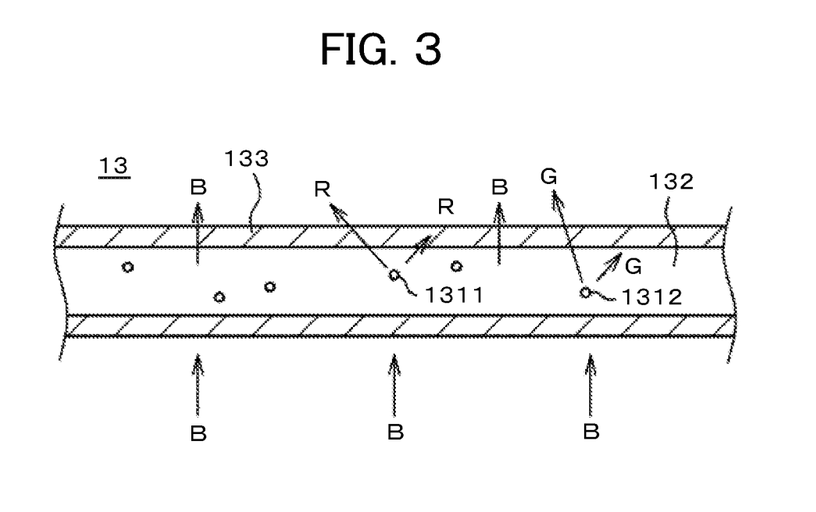
FIG. 3 is a sectional view showing motions of wavelength converters.

The light outgoing from the prism sheet 11 enters the wavelength converter 13. The wavelength converter 13 is a film where quantum dots are dispersed. FIG. 3 is a sectional view showing the wavelength converter 13. In FIG. 3, the blue light from the blue LED enters the wavelength converter from below. The incident blue light is converted to a red light by a quantum dot 1311 which converts the blue light to the red light, or converted to a green light by a quantum dot 1312 which converts the blue light to the green light. The alphabets R, G, B affixed to the arrows in FIG. 3 represent the colors of lights, respectively.

Figure 4:
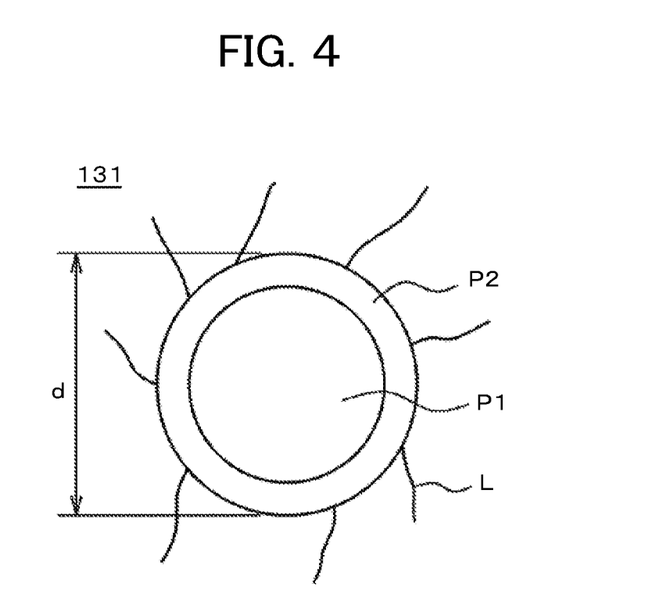
FIG. 4 is a schematic sectional view showing a quantum dot.

FIG. 4 is a schematic diagram of a quantum dot 131 as a wavelength conversion particle 13. The quantum dot 131 is a semiconductor particulate. The converted light outputted from the particle varies in wavelength according to the size of the particle. For example, a 5-nm particle outputs the green light, while a 10-nm particle outputs the red light. The size d of the quantum dot is normally 20 nm or less.

P1 and P2 in FIG. 4 each represent a semiconductor. For example, P1 is a spherical CdSe, the outside of which is covered with P2 made of ZnS. The quantum dot 131 traps the incident light therein and outputs a light having a longer wavelength than the incident light. The incident light may be the blue light or may be an ultraviolet light. The white light can be obtained by using the quantum dots of different sizes in proportions varied between the case of the incident blue light and the case of the incident ultraviolet light. The alphabet L in FIG. 4 represents an entity called "Ligand" which makes the quantum dots 131 easily dispersed in a transparent medium 132 made of resin.

Returning to FIG. 3, the quantum dots 131 are so small in size as to be chemically active. Therefore, the quantum dots are highly reactive with moisture or oxygen in the air and changed in nature. In order to prevent this, the principal surface of the wavelength converter 13 is covered with a barrier 133 for blocking oxygen and moisture.

As shown in FIG. 3, the incident blue light is subjected to wavelength conversion as impinging on the quantum dots. Specifically, the red right R and the green light G are scattered. On the other hand, the blue light goes straight. When the display screen is viewed from the front side, therefore, the blue light is dominant on the screen. When the display screen is obliquely viewed, the red light and the green light are dominant on the screen so that the display screen appears yellow.

The invention is adapted to scatter the blue light as well, so as to suppress the occurrence of the phenomenon where the color changes depending upon the viewing angle of the display screen. The scattering of light includes so-called Mie scattering and Rayleigh scattering. Mie scattering is caused by spherical particles of sizes equal to or more than the wavelength of light. On the other hand, Rayleigh scattering is dominantly caused by particles of sizes one tenth or less of the wavelength of light.

Figure 5:
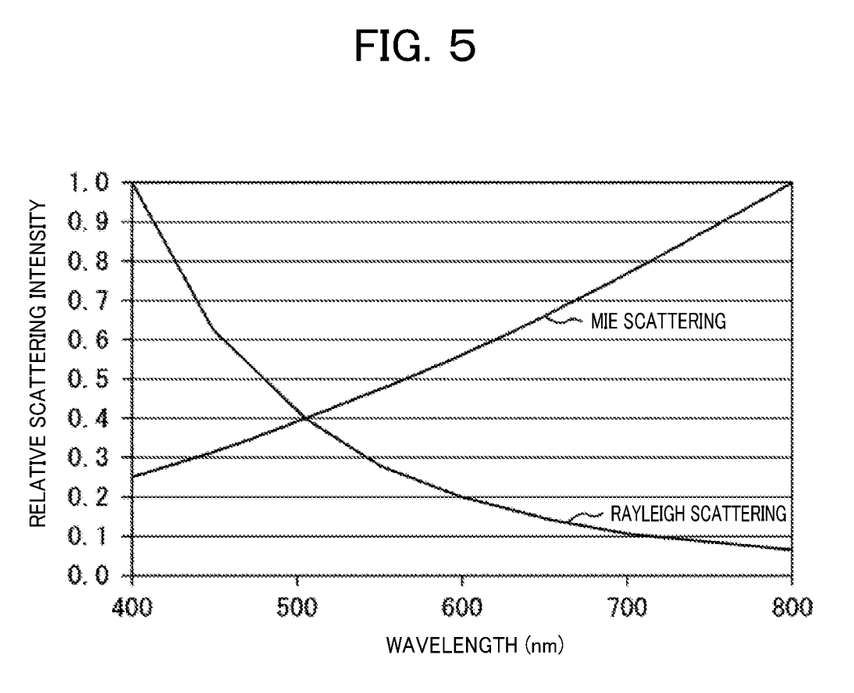
FIG. 5 is a graph showing the characteristics of Mie scattering and Rayleigh scattering.

FIG. 5 is a graph showing the comparison of light scattering intensities between a case where the particles developing Mie scattering are present and a case where the particles developing Rayleigh scattering are present. FIG. 5 shows light scatterings caused by the particles of sizes on the order of 45 nm. Mie scattering is characterized by the scattering intensity increased with the increase in the wavelength of light while Rayleigh scattering is characterized by the scattering intensity increased with the decrease in the wavelength of light.

Namely, more intensive scattering of the blue light can be achieved by providing such a member as to develop Rayleigh scattering in the rear of the wavelength converter 13.

According to the invention, as shown in FIG. 2, the particles developing Rayleigh scattering are dispersed in the adhesive 14 for bonding the wavelength converter 13 and the polarizing reflector 15 together. This adhesive is referred to as "diffusing adhesive 14" herein.

Figure 6:
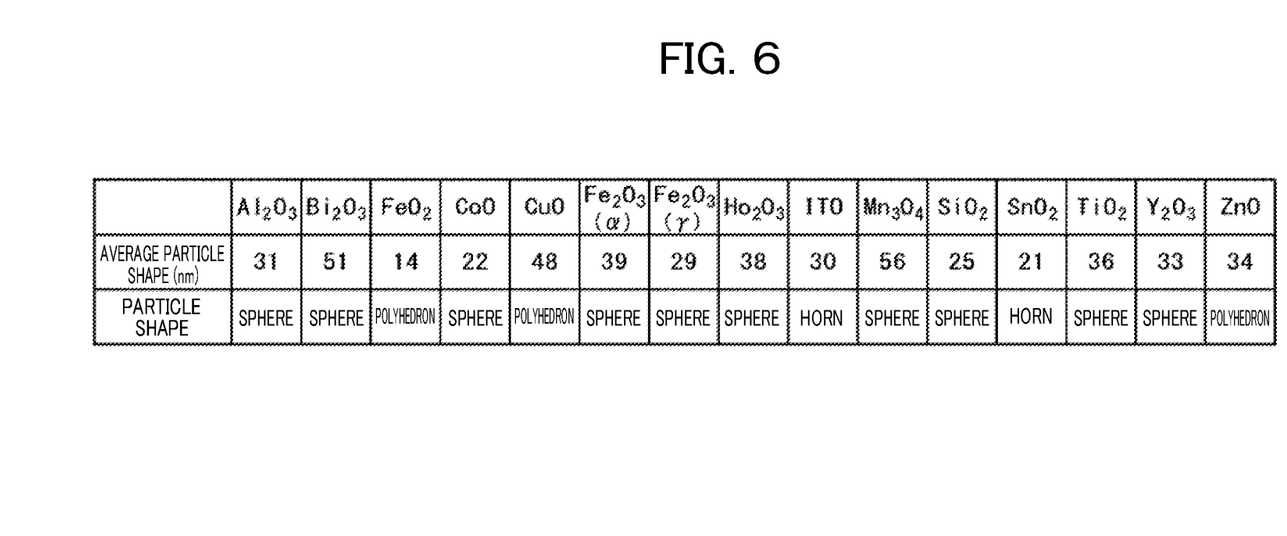
FIG. 6 is a table showing examples of nanoparticle.

To produce Rayleigh scattering, the particles must have a small size of 45 nm or less. A table of FIG. 6 shows the examples of such nanoparticles. FIG. 6 shows the mean particle sizes and particle shapes of the respective nanoparticles. Above all, $TiO_2$ is the most suitable nanoparticle in terms of chemical stability, shape, size and the like.

The density of the nanoparticles and the thickness of the adhesive material must be controlled to produce the required scattering effect in the diffusing adhesive 14. The diffusing adhesive also needs to have an adhesive force required of the adhesive material. The higher the density of the nanoparticles is, the greater is the scattering intensity. It is therefore possible to reduce the thickness of the adhesive material. However, the adhesive material is decreased in the adhesive force with the increase in the density of the nanoparticles. Further, the adhesive material needs to have a certain degree of thickness in order to maintain a required adhesive force.

Figure 7:
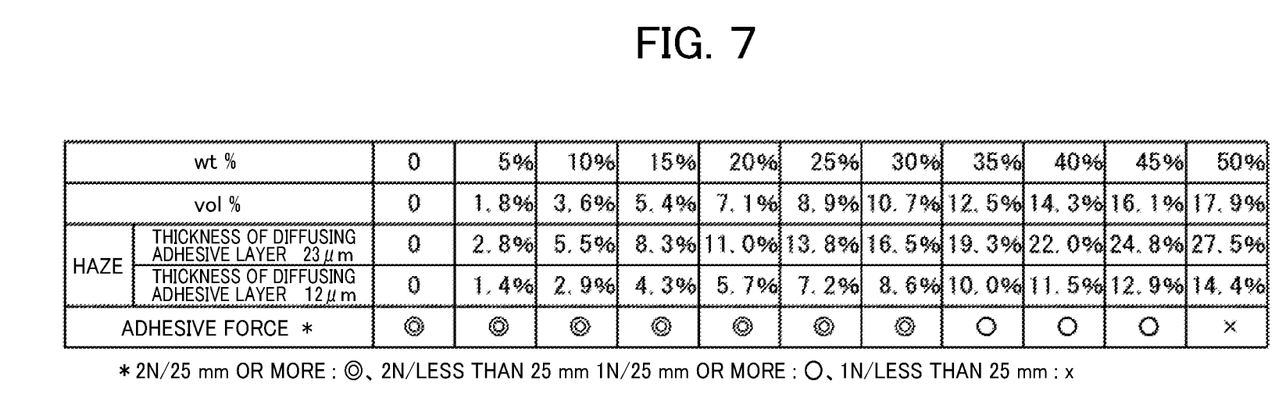
FIG. 7 is a table showing a relation of the density of nanoparticles in an adhesive, haze and the adhesive force of an adhesive.

A table of FIG. 7 shows a relation between haze and adhesive force as determined at different densities of the nanoparticles concerning a case where the thickness of the adhesive material is 23 μm and a case where the thickness of the adhesive material is 12 mm. While FIG. 7 shows the density of nanoparticles based on weight % and volume %, these concentration units are in a proportional relation. The haze represents the intensity of scattering. The required scattering for the blue light or the haze varies depending upon the type of the liquid crystal display device.

In FIG. 7, ⊚, ○ and X each denote a degree of adhesive force. ⊚ denotes an adhesive force of 2N/25 mm or more, ○ denoting an adhesive force of less than 2N/25 mm and 1N/25 mm or more, and X denoting an adhesive force of less than 1N/25 mm. ○ can be practically considered to be in the allowable range.

As shown in FIG. 7, the adhesive force is dependent on the density of nanoparticles as long as the thickness of the adhesive material is 12 μm or more. If the thickness of the adhesive material is 12 μm or more, therefore, the specifications of the diffusing adhesive can be defined according to the degree of haze. FIG. 7 shows the density of nanoparticles in terms of weight % and volume %, which are interconvertible.

Figure 8:
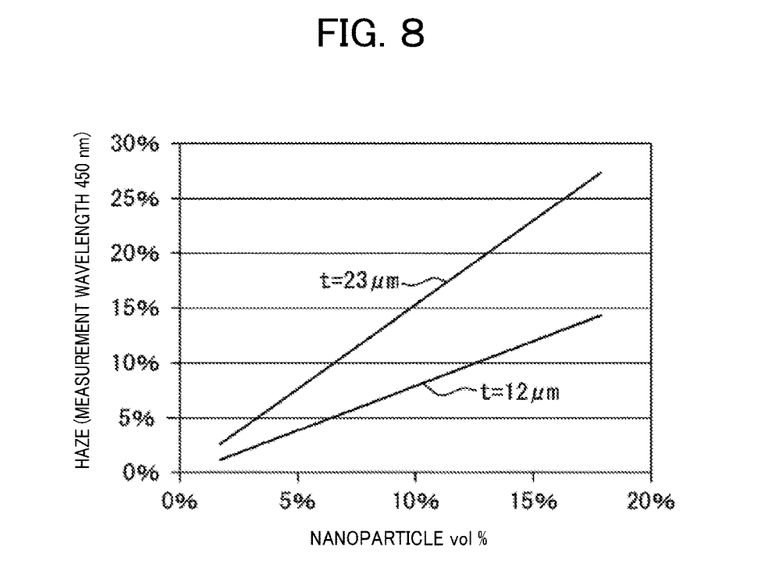
FIG. 8 is a graph showing a relation between the volume % of nanoparticles in the adhesive and the haze.

FIG. 8 shows a relation between the volume % of nanoparticles and the haze concerning a case where the diffusing adhesive has a thickness t of 12 μm and a case where the diffusing adhesive has a thickness t of 23 μm. The haze value is proportional to the volume % of the nanoparticles. Further, the haze value can be considered to be proportional to the thickness of the diffusing adhesive.

Referring to FIG. 7 and FIG. 8, the adhesive material can retain the adhesive force so long as the volume % of the nanoparticles is 16.1 or less. On the other hand, if the haze value is insufficient, the effect of the invention cannot be produced. If the volume % of the nanoparticles is 3.6%, the adhesive material having a thickness of 23 μm provides a haze value of 5.5%, and the adhesive material having a thickness of 12 μm provides a haze value of 2.9%. Thus, the effect of the invention can be achieved. For more efficient scattering of the blue light with the nanoparticles present in an amount of 7.1 volume %, the adhesive material having a thickness of 23 μm provides a haze value of 11%, and the adhesive material having a thickness of 12 μm provides a haze value of 5.7%. Thus, the effect of the invention can be further enhanced.

In this manner, the blue light can be more scattered by using the diffusing adhesive layer developing Rayleigh scattering to bond the wavelength converter and the polarizing reflector together. Therefore, color shift occurring depending upon a viewing angle of the display screen can be suppressed.

The polarizing reflector 15 shown in FIG. 2 serves to increase light use efficiency of the backlight by reflecting a light having a polarization axis which is absorbed by the lower polarizer 101 of the liquid crystal display panel 300. However, the polarizing reflector 15 may not be employed in some cases. In this case, the diffusing adhesive 14 adheres to the lower polarizer 101 of the liquid crystal display panel 300.

As shown in FIG. 2, the polarizing reflector 15 and the lower polarizer 101 are bonded together by means of the adhesive 16. This adhesive 16 may be a diffusing adhesive developing Rayleigh scattering. Namely, the number of diffusing adhesives and the thickness thereof can be changed according to a required haze.

Figure 9:
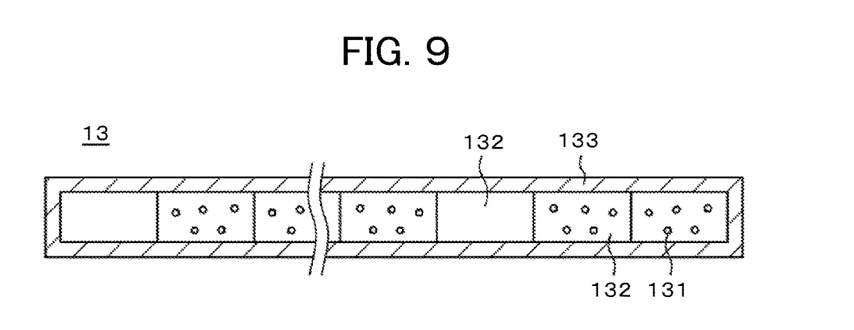
FIG. 9 is a sectional view showing another example of the wavelength converter.

The wavelength converter 13 of FIG. 2 employs the quantum dots 131 having a high degree of chemical activity so that the principal surface of the wavelength converter is formed with a blocking layer 133 as protection against oxygen and moisture in the air. As shown in FIG. 9, the wavelength converter can be more positively protected from deterioration by providing the blocking layer 133 at side ends thereof, as well.

Another feature shown in FIG. 2 is that all the components including the prism sheet 11, wavelength converter 13, the polarizing reflector 15 and the like are combined into one piece by means of the adhesive. According to the prior art, a diffusion sheet, a prism sheet, a polarizing reflector and the like are merely stacked on top of each other. Therefore, the prior-art products are susceptible to the production of gap between the sheets, which may cause a newton ring.

According to the invention, all the optical sheets of the backlight are unified by means of the adhesive and hence, the problem of newton ring as encountered by the prior-art products does not occur. Furthermore, the nanoparticles are dispersed in the adhesive material so that the blue light can be scattered more. The invention can be implemented in a more reasonable way.

The foregoing description has been made on a case where the blue LED is used as the light source. Even in a case where an LED emitting UV light is used as the light source, the invention is applicable to a case where the blue light is scattered in a small amount.

Second Embodiment

The first embodiment is directed to suppress color variation between when the display screen is viewed from the front side and when the display screen is obliquely viewed. This embodiment is configured to scatter more blue light based on refractive index difference in the group of optical sheets.

Figure 10:
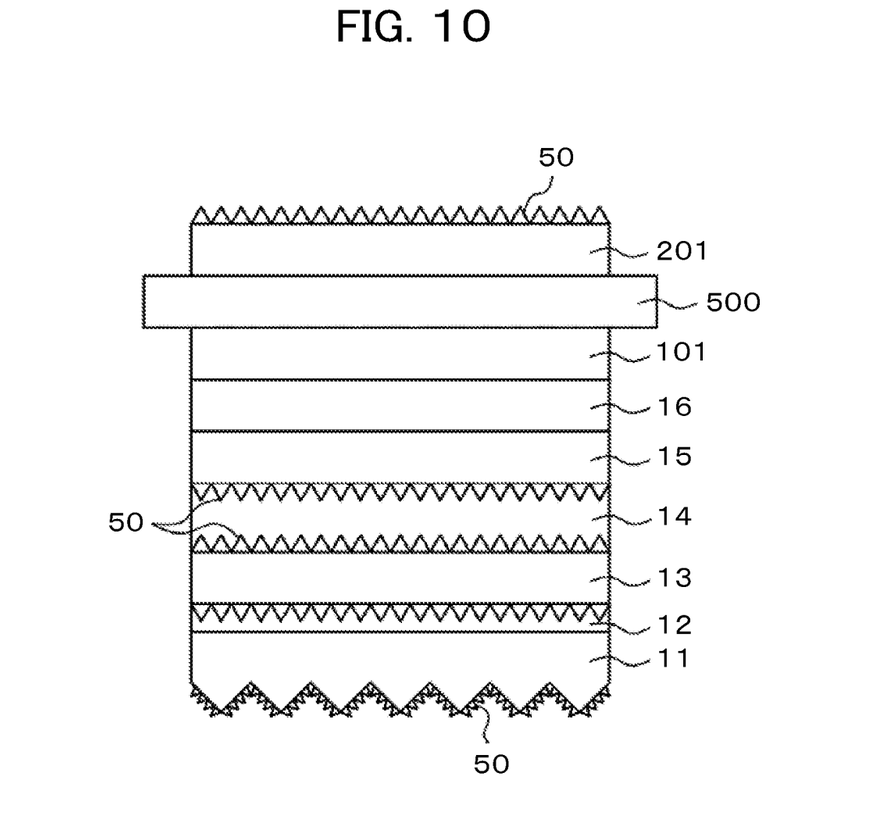
FIG. 10 is a sectional view showing a liquid crystal display device according to a second embodiment of the invention.

FIG. 10 is a sectional view showing a liquid crystal display device according to a second embodiment. FIG. 10 omits the illustration of the light guide, light source, reflective sheet and the like. FIG. 10 differs from FIG. 2 in that the prism sheet 11, the wavelength converter 13, the polarizing reflector 15 and the like are formed with very fine irregularities 50 on the surfaces thereof. The fine irregularities can be made in a prism shape, lens shape or pyramid shape.

The pitch of the irregularities 50 is smaller than that of prisms of the prism sheet. Since the prism pitch is in the range of 40 μm to 50 μm, the pitch of the irregularities is 3 μm or more and 30 μm or less, or more preferably 5 μm or more and 20 μm or less. If the irregularities 50 have a larger pitch, the scattering effect is decreased. On the other hand, it is difficult to form the irregularities at too small a pitch.

Light outgoing from the light guide 20 is scattered by these irregularities 50. The light scattering is caused by the difference of refractive index from that of another medium. The higher the refractive index of a medium is, the more scattered is the light. If a material formed with the irregularities 50 has such a refractive index dispersion characteristic that the material exhibits the greater refractive index for light of the shorter wavelength, the material scatters more blue light than lights of other colors. Even when the wavelength converter 13 is used, the scattering difference between lights of different colors can be reduced. Therefore, the color variation between when the display screen is viewed from the front side and when the display screen is obliquely viewed can be reduced.

Figure 11:
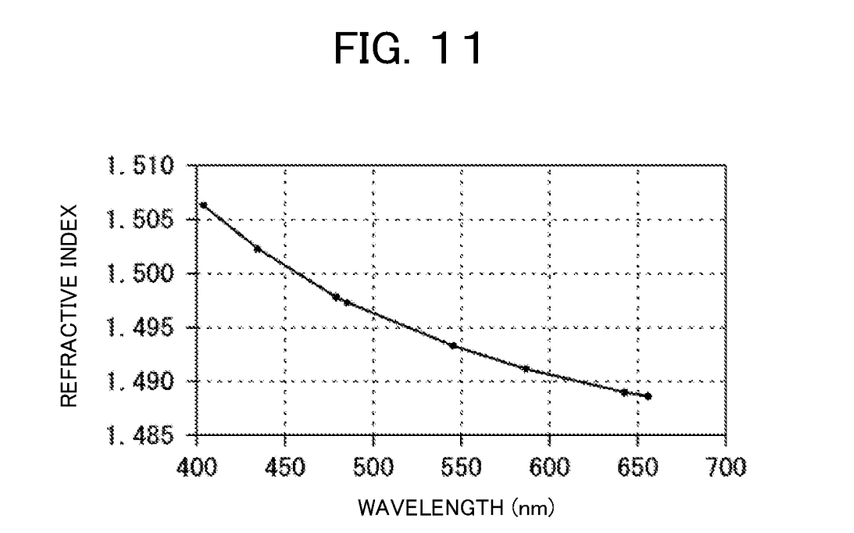
FIG. 11 is a graph showing the refractive index dispersion of an acrylic plate.

FIG. 11 is a graph showing the refractive index dispersion characteristic of an acrylic (PMMA). In FIG. 11, the abscissa is the wavelength and the ordinate is the refractive index. The graph shows that the shorter the wavelength is, the greater is the refractive index. That is, the blue light is more scattered than the red light or the green light by using acrylic as the sheet-like material having fine projections as shown in FIG. 10.

The irregularities 50 of the invention can achieve the effect by being disposed at not only the backlight but also the optical medium of the liquid crystal display panel. For example, FIG. 10 illustrates the example where the irregularities are formed from such a material as to exhibit the greater refractive index for light of the shorter wavelength and are laid on the surface of the upper polarizer. The effect of the invention can be achieved by placing such a material as to exhibit the greater refractive index for light of the short wavelength even though the material is not always formed with the fine projections. However, this material can produce an even greater effect of the invention by being formed with the fine irregularities 50 on the surface thereof.

The invention is characterized in that the quantum dots are disposed between the prism sheet and the liquid crystal cell such that light not scattered by the quantum dots (wavelength-unconverted light) is scattered between the quantum dots and the liquid crystal cell. The quantum dots can also be disposed between the prism sheet and the light source or in the liquid crystal cell. In such a case, the invention is characterized by disposing a scatterer on a light output side of the quantum dots. The scatterer can be changed in particle size or material quality such as to further scatter the light not scattered by the quantum dots (wavelength-unconverted light) than the light scattered by the quantum dots.

Figure 12:
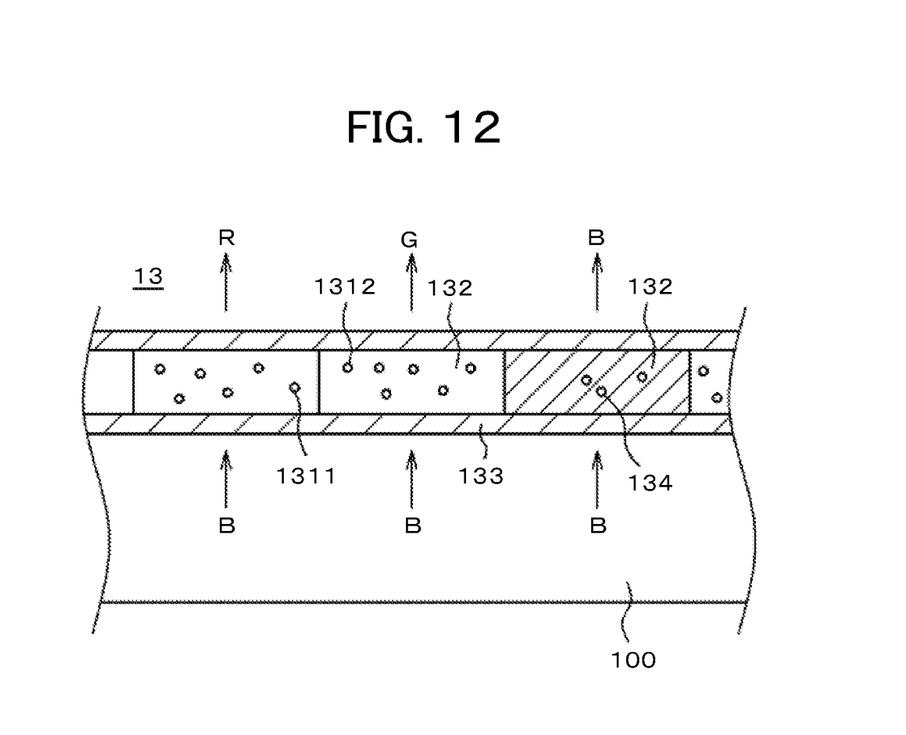
FIG. 12 is a sectional view showing a structure where the quantum dots are provided on a TFT substrate.

FIG. 12 shows a structure where the quantum dots are disposed on the TFT substrate. The liquid crystal display device is provided with pixels showing the red light, pixels showing the blue light and pixels showing the green light. The quantum dots 1311 for converting the incident blue light to the red light are disposed on a TFT substrate corresponding to the red pixel. The quantum dots 1312 for converting the incident blue light to the green light are disposed on a TFT substrate corresponding to the green pixel. The blue pixel is not provided with any quantum dots. In this case, the red light and the green light are scattered by the quantum dots but the blue light is not scattered. Therefore, nanoparticles 134 for developing Rayleigh scattering are dispersed on a TFT substrate corresponding to the blue pixel.

What is claimed is:

1. A liquid crystal display device comprising:
   a light source;
   a liquid crystal cell;
   a wavelength converter disposed between the liquid crystal cell and the light source;
   a scatter including nanoparticles and disposed between the wavelength converter and the liquid crystal cell; and
   a prism sheet is present between the wavelength converter and the light source, wherein
   the prism sheet and the wavelength converter are bonded together and attached to a lower polarizer of the liquid crystal cell.

2. The liquid crystal display device according to claim 1, wherein
   the wavelength converter includes quantum dots, and the light source is a blue LED.

3. The liquid crystal display device according to claim 1, wherein
   the nanoparticles are dispersed in an adhesive disposed between the wavelength converter and the liquid crystal cell.

4. The liquid crystal display device according to claim 1, wherein
   particle size of the nanoparticles is 45 nm or less, and the nanoparticles develop Rayleigh scattering.

5. The liquid crystal display device according to claim 1, wherein
   the nanoparticles are $TiO_2$.

6. The liquid crystal display device according to claim 3, wherein
   volume percent of the nanoparticles in the adhesive is in the range of 3.6% to 16.1%.

7. The liquid crystal display device according to claim 3, wherein
   volume percent of the nanoparticles in the adhesive is in the range of 7.1% to 16.1%.

8. A liquid crystal display device comprising a liquid crystal display panel outputting different colors on each pixel, and a backlight, wherein
   the backlight includes: a light source; a light guide; a reflective sheet on a back side of the light guide; and a group of optical sheets including a wavelength converter and disposed between the liquid crystal display panel and the light guide,
   the wavelength converter includes quantum dots,
   a surface of at least one of the group of optical sheets has irregularities,
   the irregularities exhibit a characteristic in which the shorter the wavelength, the higher refractive index, and
   the irregularities are formed on a surface of the wavelength converter.

9. The liquid crystal display device according to claim 8, wherein
   the light source is a blue LED.

10. The liquid crystal display device according to claim 8, wherein
    a prism sheet is disposed between the wavelength converter and the light guide, and a surface of the prism sheet is formed with the irregularities at a smaller pitch than a prism pitch.

11. The liquid crystal display device according to claim 8, wherein
the wavelength converter is bonded to another optical medium by means of a diffusing adhesive, and
the diffusing adhesive has nanoparticles dispersed therein for developing Rayleigh scattering.

12. The liquid crystal display device according to claim 11, wherein
the diffusing adhesive is applied to the wavelength converter on a liquid-crystal-display-panel side thereof for bonding the wavelength converter to another optical medium.

13. The liquid crystal display device according to claim 8, wherein
a reflective polarizer is disposed between the wavelength converter and the liquid crystal display panel, and
the irregularities are formed on the reflective polarizer.

14. The liquid crystal display device according to claim 8, wherein
the group of optical sheets are bonded together and attached to a lower polarizer of the liquid crystal display panel.

15. The liquid crystal display device according to claim 8, wherein
the irregularities are formed on an upper polarizer of the liquid crystal display panel.

16. The liquid crystal display device according to claim 11, wherein
volume percent of the nanoparticles in the diffusing adhesive is in the range of 3.6% to 16.1%.

17. The liquid crystal display device according to claim 11, wherein
volume percent of the nanoparticles in the diffusing adhesive is the range of 7.1% to 16.1%.

* * * * *